US006538097B2

(12) United States Patent
Yamaguchi et al.

(10) Patent No.: US 6,538,097 B2
(45) Date of Patent: Mar. 25, 2003

(54) PROCESS FOR PRODUCTION OF POLYIMIDE POWDER, POLYIMIDE POWDER, POLYIMIDE POWDER MOLDED BODIES AND PROCESS FOR THEIR PRODUCTION

(75) Inventors: Hiroaki Yamaguchi, Tokyo (JP); Fumio Aoki, Ichihara (JP)

(73) Assignee: UBE Industries, Ltd., Ube (JP)

( * ) Notice: Subject to any disclaimer, the term of this patent is extended or adjusted under 35 U.S.C. 154(b) by 0 days.

(21) Appl. No.: 09/984,238

(22) Filed: Oct. 29, 2001

(65) Prior Publication Data
US 2002/0052464 A1 May 2, 2002

(30) Foreign Application Priority Data

Oct. 31, 2000 (JP) ........................ 2000-332277

(51) Int. Cl.$^7$ ..................... C08G 73/10; B32B 27/00; B29C 43/00
(52) U.S. Cl. ..................... 528/170; 528/125; 528/126; 528/128; 528/172; 528/173; 528/176; 528/179; 528/183; 528/188; 528/220; 528/229; 528/350; 528/351; 528/353; 264/319; 264/320; 264/325; 428/402; 428/473.5
(58) Field of Search ............................. 428/402, 473.5; 528/353, 170, 125, 126, 128, 172, 173, 176, 179, 183, 188, 220, 229, 350, 351; 264/319, 320, 325

(56) References Cited

U.S. PATENT DOCUMENTS

| 4,755,428 A | | 7/1988 | Noda et al. ................. 428/402 |
| 5,589,111 A | * | 12/1996 | Haruta et al. .................. 264/8 |
| 5,898,048 A | * | 4/1999 | Yamaguchi et al. ......... 528/353 |

FOREIGN PATENT DOCUMENTS

JP 07033873 2/1995

* cited by examiner

Primary Examiner—P. Hampton-Hightower
(74) Attorney, Agent, or Firm—Morgan Lewis & Bockius LLP

(57) ABSTRACT

A process for production of polyimide powder, which comprises reacting a biphenyltetracarboxylic dianhydride and an aromatic diamine in an amide-based solvent optionally containing a water-soluble ketone, in the presence of an imidazole at 1–100 equivalent percent based on the carboxylic acid content of the polyimide precursor, separating and collecting the produced polyimide precursor powder from a water-soluble ketone solvent containing 3–30 wt % of an amide-based solvent, and heating the polyimide precursor powder to an imidation rate of 90% or greater, as well as polyimide powder obtained thereby, molded bodies of the polyimide powder, and a process for production of the molded bodies.

12 Claims, No Drawings

PROCESS FOR PRODUCTION OF POLYIMIDE POWDER, POLYIMIDE POWDER, POLYIMIDE POWDER MOLDED BODIES AND PROCESS FOR THEIR PRODUCTION

BACKGROUND OF THE INVENTION

1. Field of the Invention

The present invention relates to polyimide powder which gives polyimide powder molded bodies that maintain a high level of heat resistance with particularly high flexural strength and tensile strength and high elongation, as well as to polyimide powder molded bodies and to a process for their production.

2. Description of the Related Art

Pyromellitic acid-based polyimide powder molded bodies obtained from a pyromellitic acid component and 4,4'-diaminodiphenyl ether have been widely used in the prior art as polyimide powder molded bodies because of their high toughness and satisfactory cutting workability.

However, pyromellitic acid-based polyimide molded bodies have high moisture absorption, considerable out gas and low chemical resistance and dimensional stability.

3,3',4,4'-biphenyltetracarboxylic acid-based polyimide powder molded bodies have therefore been proposed.

Examples of such 3,3',4,4'-biphenyltetracarboxylic acid-based polyimide powder molded bodies are described, for example, in Japanese Unexamined Patent Publication No. 57-200453, wherein there are obtained heated/compressed molded bodies of relatively large-sized aromatic polyimide powder with an imidation rate of 95% or greater obtained by polymerization and imidation of a 3,3',4,4'-biphenyltetracarboxylic acid component and an aromatic diamine component in N-methyl-2-pyrrolidone.

Also, Japanese Examined Patent Publication No. 39-22196 describes polyimide powder obtained by synthesizing a polyimide precursor in an amide-based solvent and reprecipitating the solution with a mixture of toluene, pyridine and acetic anhydride for imidation, and it is indicated that the polyimide powder obtained by this process gives molded bodies with satisfactory cohesion and high density. In addition, Japanese Unexamined Patent Publication No. 7-33873 describes a process for synthesis of a polyimide precursor powder in a water-soluble ketone, whereby removal of the solvent is facilitated, production of polyimide precursor powder with a high degree of polymerization is possible, and the molded bodies obtained from the polyimide precursor exhibit excellent dynamic properties and low residual solvent.

However, since it is difficult by the process described in Japanese Examined Patent Publication No. 39-22196 mentioned above to produce fine polyimide powder, and partial lump formation hampers efforts to achieve a uniform particle size, the molded bodies formed from the powder tend to be irregular. Moreover, employing the process of Japanese Unexamined Patent Publication No. 7-33873 tends to give fine powder with poor filtering properties, while the powder easily coheres together after filtration and during imidation in the solid phase. Also, polyimide powder obtained from 3,3',4,4'-biphenyltetracarboxylic dianhydride and para-phenylenediamine as the aromatic diamine component using this process has insufficient molecular weight, resulting in brittle molded bodies.

BRIEF SUMMARY OF THE INVENTION

It is therefore an object of the present invention to provide polyimide powder molded bodies with excellent heat resistance and satisfactory mechanical properties which are obtained from polyimide powder whose particle size can be controlled and which exhibits satisfactory filtering properties and no cohesion between particles, as well as polyimide powder as the starting material therefor and a process for their production.

In other words, the present invention provides a process for production of polyimide powder which comprises reacting a biphenyltetracarboxylic dianhydride and an aromatic diamine in an amide-based solvent optionally containing a water-soluble ketone, in the presence of an imidazole at 1–100 equivalent percent and preferably 6–100 equivalent percent based on the carboxylic acid content of the polyimide precursor, separating and collecting the produced polyimide precursor powder from a water-soluble ketone solvent containing 3–30 wt % of an amide-based solvent, and heating the separated and collected polyimide precursor powder to an imidation rate of 90% or greater.

The invention further provides polyimide powder obtained by the aforementioned process.

The invention still further provides biphenyltetracarboxylic acid-based polyimide powder molded bodies having a density of at least 1.3 g/mm$^3$, a tensile strength of at least 800 Kg/cm$^2$ and a tensile break elongation of at least 10%, obtained by subjecting the aforementioned polyimide powder to heat and pressure in a die either simultaneously or separately.

The invention still further provides a process for production of polyimide powder molded bodies whereby the aforementioned polyimide powder is packed into a die and subjected to heat in a range of about 300–550° C. and pressure in a range of about 100–5000 Kg/cm$^2$ either simultaneously or separately for molding.

DETAILED DESCRIPTION OF THE INVENTION

Preferred embodiments of the invention are listed below.

1) The aforementioned process for production of polyimide powder wherein the 2,3,3',4'-biphenyltetracarboxylic dianhydride unit is included at 30 mole percent or greater.

2) The aforementioned process for production of polyimide powder molded bodies wherein the molding step is carried out by compression molding, wet CIP or dry CIP (CIP: Cold Isostatic Pressure) or HIP (HIP: Hot Isostatic Pressure).

According to the invention, the tetracarboxylic acid component of the polyimide may be 3,3',4,4'-biphenyltetracarboxylic dianhydride and/or 2,3,3',4'-biphenyltetracarboxylic dianhydride, and is preferably a biphenyltetracarboxylic dianhydride containing at least 30 mole percent of 2,3,3',4'-biphenyltetracarboxylic dianhydride.

Part of the biphenyltetracarboxylic dianhydride may be replaced with another aromatic tetracarboxylic dianhydride such as pyromellitic dianhydride, 3,3',4,4'-benzophenonetetracarboxylic dianhydride, 2,2'-bis(3,4-dicarboxyphenyl)propane dianhydride, bis(3,4-dicarboxyphenyl)methane dianhydride or bis(3,4-dicarboxyphenyl)ether dianhydride, so long as the effect of the invention is not hindered.

The diamine component used may be any aromatic diamine such as, for example, para-phenylenediamine (p-phenylenediamine), 4,4'-diaminodiphenyl ether, 1,3-bis(4-aminophenoxy)benzene, 4,4'-diaminodiphenylpropane, 4,4'-diaminodiphenylethane, 4,4'-diaminodiphenylmethane, bis[4-(4-aminophenoxy)phenyl]propane, 2,2'-bis[4-(4-aminophenoxy)phenyl]-1,1,1,3,3,3-hexafluoropropane or bis[4-(4-aminophenoxy)phenyl]ether, among which para-phenylenediamine (p-phenylenediamine) and 4,4'-diaminodiphenyl ether are preferably used.

According to the invention, it is necessary to react a biphenyltetracarboxylic dianhydride with an aromatic diamine in an amide-based solvent optionally containing a water-soluble ketone, in the presence of an imidazole at 1–100 equivalent percent and preferably 6–100 equivalent percent based on the carboxylic acid content of the polyimide precursor, separate and collect the produced polyimide precursor from a water-soluble ketone solvent containing 3–30 wt % of an amide-based solvent, and heat the separated and collected polyimide precursor powder to an imidation rate of 90% or greater to obtain the polyimide powder.

According to the invention, a biphenyltetracarboxylic dianhydride may be reacted with a molar equivalent of an aromatic diamine for about 30 minutes to 24 hours at 10–40° C. in a water-soluble ketone solvent containing 3–30 wt % of an amide-based solvent in the presence of the necessary amount of an imidazole, and then the high-molecularized precipitated polyimide precursor separated and collected. In this case, the total of the biphenyltetracarboxylic dianhydride and aromatic diamine in the solution is preferably 1–20 wt %.

Alternatively, a biphenyltetracarboxylic dianhydride may be reacted with a molar equivalent of an aromatic diamine for about 30 minutes to 24 hours at 10–40° C. in an amide-based solvent in the presence of the necessary amount of an imidazole to produce a high molecular polyimide precursor, and then a water-soluble ketone added to the reaction mixture in an amount giving an amide-based solvent proportion of 3–30 wt % of the solvent component to precipitate powder, and the polyimide precursor powder separated and collected. In this case, the total of the biphenyltetracarboxylic dianhydride and aromatic diamine in the solution is preferably 1–20 wt %, and water is preferably included in the amide-based solvent at 1–20 wt %.

As amide-based solvents there may be mentioned N-methyl-2-pyrrolidone, N,N-dimethylacetamide, N,N-dimethylformamide and N-methylcaprolactam, among which N-methyl-2-pyrrolidone and N,N-dimethylacetamide are preferably used.

As water-soluble ketones there may be mentioned acetone, γ-butyrolactone, methylethyl ketone, methylisobutyl ketone and cyclohexanone.

According to the invention, an imidazole must be present during the reaction between the biphenyltetracarboxylic dianhydride and the aromatic diamine.

The amount of the imidazole is preferably 1–100 equivalent percent and especially 6–100 equivalent percent based on the carboxylic acid content of the polyimide precursor.

If the amount of the imidazole is below this range the polyimide powder will not have sufficient molecular weight and the molded body will therefore be brittle, while if the amount of the imidazole is above this range, no further effect is exhibited, resulting in an economic disadvantage.

The imidazole may be added at the initial stage when the other components are added, during the reaction, or in a final stage of the reaction, but it is preferably added in a final stage of the reaction.

As imidazoles there may be mentioned 1,2-dimethylimidazole, imidazole, benzimidazole, N-methylimidazole, N-benzyl-2-methylimidazole, 2-methylimidazole, 2-ethyl-4-methylimidazole and 5-methylbenzimidazole. A portion of the imidazole may be replaced with isoquinoline, 3,5-dimethylpyridine, 3,4-dimethylpyridine, 2,5-dimethylpyridine, 2,4-dimethylpyridine, 4-n-propylpyridine or the like.

According to the invention, the polyimide precursor powder precipitated by the method described above may be filtered and washed with a water-soluble ketone to separate and collect the polyimide precursor powder, and this then heated to obtain polyimide powder with an imidation rate of 90% or greater.

The heating may be carried out at no higher than 250° C. under either normal pressure or reduced pressure, and preferably at no higher than 200° C., to produce a dry state with a weight reduction of preferably no greater than 1% and especially no greater than 0.5% with heating for one hour at 350° C.

According to the invention, the aforementioned polyimide powder is packed into a die and subjected to heat in a range of about 300–550° C. and pressure in a range of about 100–5000 $Kg/cm^2$ either simultaneously or separately to form a biphenyltetracarboxylic acid-based polyimide powder molded body with a density of 1.3 $g/mm^3$ or greater, a tensile strength of 800 $Kg/cm^2$ or greater and a tensile break elongation of 10% or greater.

The molding step may be accomplished by compression molding, wet CIP or dry CIP (CIP: Cold Isostatic Pressure) or HIP (HIP: Hot Isostatic Pressure).

For production of the aforementioned powder molded body, a filler of any type, for example, an inorganic filler such as artificial diamond, silica, mica, kaolin, boron nitride, aluminum oxide, iron oxide, graphite, molybdenum sulfide or iron sulfide, or an organic filler such as a fluorine resin, may be mixed with the polyimide powder.

The filler addition may be accomplished by mixing using any internal addition or external addition method.

Polyimide molded bodies obtained by the process of the invention exhibit good uniformity, satisfactory elongation and high productivity without loss of the excellent heat resistance and dimensional stability of conventional publicly known biphenyltetracarboxylic acid-based polyimide powder molded bodies.

Examples of the invention will now be described.

In the examples, the imidation rates are expressed as the proportion (%) of the IR spectrum absorbance ratio [absorbance (1780 $cm^{-1}$)/absorbance (1720 $cm^{-1}$)] for the test polyimide with respect to the absorbance ratio for a polyimide with 100% ring closure.

Also, the glass transition temperature (Tg) of each polyimide is the value measured with an SSC5200 RDSC220C by Seiko Instruments Co., Ltd. at a temperature elevating rate of 10° C.

The abbreviations used in the descriptions which follow refer to the compounds listed below.

a-BPDA: 2,3,3',4'-biphenyltetracarboxylic dianhydride
s-BPDA: 3,3',4,4'-biphenyltetracarboxylic dianhydride
PPD: p-phenylenediamine
ODA: 4,4'-diaminodiphenyl ether
DMZ: 1,2-dimethylimidazole
2MZ: 2-methylimidazole
NMP: N-methyl-2-pyrrolidone
DMAc: N,N-dimethylacetamide

EXAMPLE 1

After adding and dissolving 14.71 g (0.05 mol) of a-BPDA in 282.28 g of a mixed solvent of 85 wt % acetone and 15 wt % DMAc in a 500 ml volume four-necked separable flask equipped with a stirrer, thermometer and nitrogen inlet tube at room temperature, a solution of 5.41 g (0.05 mol) of PPD dissolved in 100 g of a mixed solvent of 85 wt % acetone and 15 wt % DMAc was added over a period of one minute, and reaction was conducted for one hour until complete precipitation of the polyimide precursor powder. After then adding 2.12 g (0.022 mol) of DMZ to the suspension, it was stirred for one hour. The suspension was subjected to filtration and acetone washing to collect the powder. The filtration property was satisfactory. The powder was heated at 60° C. for 30 minutes and 180° C. for 10 hours for imidation to obtain 17.02 g (92.9%) of a polyimide powder. The polyimide powder had an imidation rate of 95%.

The polyimide powder was packed into a 50 mmϕ die for premolding at room temperature and a pressure of 200 Kg/cm$^2$, and after removing the premolded body from the die and free sintering at 400° C. for 30 minutes, a pressure of 250 Kg/cm$^2$ was applied to the sintered body and maintained at 450° C. for 30 minutes. The heating was then halted for cooling while maintaining the pressure, and the molded body was removed when the temperature fell below 300° C. The molded body had uniform reddish-brown transparency, a density of 1.37 g/cc and a Tg of 412° C. Upon measurement of the tensile strength, elongation, flexural strength and flexural modulus of the molded body at 23° C. according to ASTM D-638 and D790, the tensile strength was 935 Kg/cm$^2$, the tensile break elongation was 18.7%, the flexural strength was 1100 Kg/cm$^2$ and the flexural modulus was 33,000 Kg/cm$^2$.

EXAMPLE 2

After adding and dissolving 14.71 g (0.05 mol) of a-BPDA in 280 g of a mixed solvent of 85 wt % acetone and 15 wt % DMAc in a 1000 ml volume four-necked separable flask equipped with a stirrer, thermometer and nitrogen inlet tube at room temperature, a solution of 10.01 g (0.05 mol) of ODA dissolved in 189.68 g of a mixed solvent of 85 wt % acetone and 15 wt % DMAc was added over a period of one minute, and then the same procedure as Example 1 was followed, except for using 2.47 g (0.026 mol) of DMZ, to obtain 21.76 g (94.9%) of a polyimide powder. The polyimide powder had an imidation rate of 95%.

Molding was carried out in the same manner as Example 1, except that the polyimide powder was subjected to free sintering and hot compression at 280° C. and 350° C., respectively. The molded body had uniform reddish-brown transparency, a density of 1.32 g/cm$^3$ and a Tg of 330° C. The tensile strength was 1014 Kg/cm$^2$, the tensile break elongation was 54.1%, the flexural strength was 1250 Kg/cm$^2$ and the flexural modulus was 27,400 Kg/cm$^2$.

EXAMPLE 3

The same procedure was followed as in Example 2, except for using s-BPDA as the acid component and reacting it in the suspension, to obtain 22.56 g (98.4%) of a polyimide powder. Molding was carried out in the same manner as Example 1, except that the polyimide powder was subjected to free sintering and hot compression at 270° C. and 370° C., respectively. The molded body had a density of 1.36 g/cm$^3$ and no distinct Tg. The tensile strength was 1100 Kg/cm$^2$, the tensile break elongation was 16.1%, the flexural strength was 1610 Kg/cm$^2$ and the flexural modulus was 40,550 Kg/cm$^2$.

EXAMPLE 4

After adding 5.41 g (0.05 mol) of PPD, 90.5 g of NMP and 9.05 g of water into a 200 ml volume four-necked separable flask equipped with a stirrer, reflux condenser, thermometer and nitrogen inlet tube at room temperature, 14.71 g (0.05 mol) of a-BPDA was added to the mixture while circulating nitrogen gas and stirring, to prepare a solution with each monomer component uniformly dissolved in the NMP solvent. The temperature was then raised to 80° C. over a period of about 45 minutes and the mixture was stirred for 2 hours. The solution was then cooled to 60° C., 2 g (0.024 mol) of 2MZ was added and the mixture was stirred for one hour and then cooled to room temperature to obtain a 0.7 poise solution. This solution was gradually added to a vessel equipped with a high shear mixer and containing 1000 ml (approximately 790 g) of acetone at room temperature, to obtain a polyimide precursor powder. The powder was filtered, washed twice with 500 ml of acetone, and then filtered again. The powder was heated at 150° C. for 10 hours, 180° C. for 5 hours and 260° C. for 2 hours for imidation to obtain 18.02 g (98.4%) of a polyimide powder. The imidation rate of the powder was approximately 100%. The molded body obtained from the powder had a density of 1.37 g/cm$^3$, a tensile strength of 1020 Kg/cm$^2$ and a tensile break elongation of 31.4%.

EXAMPLE 5

The same procedure was followed as in Example 4, except for using s-BPDA as the acid component and DMZ as the imidazole, to obtain a 2.8 poise solution. This solution was treated in the same manner as Example 4 to obtain 18.14 g (99.0%) of a polyimide powder. Molding was carried out in the same manner as Example 1, except that the polyimide powder was subjected to free sintering and hot compression at 330° C. and 470° C., respectively. The imidation rate of the powder was approximately 100%. The molded body had a density of 1.48 g/cm$^3$, a tensile strength of 1400 Kg/cm$^2$ and a tensile break elongation of 14.0%.

Comparative Example 1

The same procedure was followed as in Example 1, except that no DMZ was added, to obtain 16.67 g (91.0%) of a polyimide powder. The imidation rate of the powder was 85%. The molded body had a density of 1.37 g/cm$^3$, a tensile strength of 766 Kg/cm$^2$ and a tensile break elongation of 9.0%.

Comparative Example 2

The same procedure was followed as in Example 3, except that the solvent was a mixed solvent of 85 wt % acetonitrile and 15 wt % DMAc and the charging amounts of s-BPDA and ODA were both 0.02 mol, to obtain 8.20 g (89.5%) of a polyimide powder. The molded body was brittle and its mechanical properties were unmeasurable.

Comparative Example 3

The same procedure was followed as in Example 5, except that no DMZ was added, to obtain 17.83 g (97.3%) of a polyimide powder. The imidation rate of the powder was 80%. The molded body had a density of 1.48 g/cm$^3$, a tensile strength of 1200 Kg/cm$^2$ and a tensile break elongation of 5.0%.

Comparative Example 4

After adding 4.32 g (0.04 mol) of PPD and 91.1 g of NMP into a 200 ml volume four-necked separable flask equipped with a stirrer, reflux condenser (with water separator), thermometer and nitrogen inlet tube at 60° C., 11.76 g (0.04 mol)

of a-BPDA was added to the mixture while circulating nitrogen gas and stirring, to prepare a solution with each monomer component uniformly dissolved in the NMP solvent. The solvent and produced water were then refluxed while continuing the nitrogen gas circulation and stirring of the solution so that the produced water was removed, and upon raising the temperature to 190° C. over a period of about 30 minutes, a yellow gel was produced, with the entirety becoming lumpy and impossible to stir after 25 minutes. At that point, the reaction was suspended, the lump was collected and dried at 180° C. for 3 hours, and then the crushed polyimide powder was molded in the same manner as Example 1. The molded body had a tensile strength of 100 Kg/cm$^2$ and a tensile break elongation of 1.0%.

The present invention having the construction described in detail above exhibits the following effects.

According to the process of the invention, it is possible to efficiently produce polyimide powder having good uniformity and mechanical properties without reduced heat resistance or dimensional stability.

The polyimide powder obtained by the process of the invention exhibits satisfactory workability.

Molded bodies obtained according to the invention exhibit satisfactory heat resistance, strength and elongation.

What is claimed is:

1. A process for production of polyimide powder which comprises reacting a biphenyltetracarboxylic dianhydride and an aromatic diamine in an amide-based solvent optionally containing a water-soluble ketone, in the presence of an imidazole at 1–100 equivalent percent based on the carboxylic acid content of the polyimide precursor, separating and collecting the produced polyimide precursor powder from a water-soluble ketone solvent containing 3–30 wt % of an amide-based solvent, and heating the polyimide precursor powder to an imidation rate of 90% or greater.

2. The process of claim 1, wherein the amount of the imidazole is 6–100 equivalent percent based on the carboxylic acid content of the polyimide precursor.

3. The process of claim 1, wherein the biphenyltetracarboxylic dianhydride contains at least 30 mole percent of 2,3,3',4'-biphenyltetracarboxylic dianhydride.

4. The process of claim 1, wherein the amide-based solvent is selected from among N-methyl-2-pyrrolidone, N,N-dimethylacetamide, N,N-dimethylformamide and N-methylcaprolactam.

5. The process of claim 1, wherein the water-soluble ketone is selected from among acetone, γ-butyrolactone, methylethyl ketone, methylisobutyl ketone and cyclohexanone.

6. The process of claim 1, wherein the imidazole is selected from among 1,2-dimethylimidazole, imidazole, benzimidazole, N-methylimidazole, N-benzyl-2-methylimidazole, 2-methylimidazole, 2-ethyl-4-methylimidazole and 5-methylbenzimidazole.

7. The process of claim 1, wherein heating of the polyimide precursor powder is performed at a temperature of 250° C.

8. Polyimide powder derived from the process of any one of the preceding claims.

9. A biphenyltetracarboxylic acid-based polyimide powder molded body having a density of at least 1.3 g/mm$^3$, a tensile strength of at least 800 Kg/cm$^2$ and a tensile break elongation of at least 10%, derived from subjecting polyimide powder according to claim 8 to heat and pressure in a die either simultaneously or separately.

10. A molded body according to claim 9, which comprises at least 30 mole percent of a 2,3,3',4'-biphenyltetracarboxylic dianhydride unit.

11. A process for production of a polyimide powder molded body, whereby polyimide powder according to claim 8 is packed into a die and subjected to heat in a range of about 300–550° C. and pressure in a range of about 100–5000 Kg/cm$^2$ either simultaneously or separately for molding.

12. The process of claim 11, wherein the molding step is performed by compression molding, wet CIP, dry CIP or HIP.

* * * * *